US012417463B2

(12) United States Patent
Grinberg

(10) Patent No.: US 12,417,463 B2
(45) Date of Patent: Sep. 16, 2025

(54) COMPUTER-IMPLEMENTED PROCESS FOR IMPROVED DELIVERY OF COMMODITIES TO CONSUMERS

(71) Applicant: Greg Grinberg, New Preston, CT (US)

(72) Inventor: Greg Grinberg, New Preston, CT (US)

(*) Notice: Subject to any disclaimer, the term of this patent is extended or adjusted under 35 U.S.C. 154(b) by 431 days.

(21) Appl. No.: 17/150,729

(22) Filed: Jan. 15, 2021

(65) Prior Publication Data

US 2021/0312467 A1 Oct. 7, 2021

Related U.S. Application Data

(63) Continuation of application No. 13/610,768, filed on Sep. 11, 2012, now Pat. No. 10,896,427.

(60) Provisional application No. 61/547,752, filed on Oct. 17, 2011, provisional application No. 61/533,222, filed on Sep. 11, 2011.

(51) Int. Cl.
*G06Q 30/08* (2012.01)
*A47G 29/14* (2006.01)
*G06Q 30/00* (2023.01)

(52) U.S. Cl.
CPC .......... *G06Q 30/00* (2013.01); *A47G 29/141* (2013.01); *G06Q 30/08* (2013.01); *A47G 2029/146* (2013.01); *A47G 2029/147* (2013.01)

(58) Field of Classification Search
CPC .... G06Q 30/00; G06Q 30/08; G06Q 30/0836; A47G 29/141; A47G 2029/146; A47G 2029/147
USPC .......... 705/332
See application file for complete search history.

(56) References Cited

U.S. PATENT DOCUMENTS

| | | | | |
|---|---|---|---|---|
| 3,656,651 | A | 4/1972 | Hage | |
| 6,039,467 | A | 3/2000 | Holmes | |
| 6,974,928 | B2 * | 12/2005 | Bloom | G07F 17/13 700/215 |
| 7,122,763 | B1 | 10/2006 | Liu et al. | |
| 7,972,064 | B2 * | 7/2011 | Anderson | B65D 81/2023 383/105 |
| 8,423,431 | B1 | 4/2013 | Rouaix et al. | |
| 8,554,694 | B1 * | 10/2013 | Ward | G06Q 30/0635 705/330 |
| 2001/0017507 | A1 | 8/2001 | Hara | |
| 2002/0035515 | A1 | 3/2002 | Moreno | |
| 2002/0111914 | A1 | 8/2002 | Terada et al. | |

(Continued)

FOREIGN PATENT DOCUMENTS

| | | | | |
|---|---|---|---|---|
| DE | 10103756 C1 * | 8/2002 | | A47G 29/141 |
| WO | WO-0176427 A1 * | 10/2001 | | A47G 29/141 |

OTHER PUBLICATIONS

Cook, John, "Amazon's new locker system at 7-Eleven is not its first foray into pick-up stations" Sep. 8, 2011, geekwire.com, 6 pages (Year: 2011).*

(Continued)

*Primary Examiner* — Shannon S Campbell
*Assistant Examiner* — Freda A Nelson
(74) *Attorney, Agent, or Firm* — Ryan, Mason & Lewis, LLP

(57) ABSTRACT

The invention provides an improved method of logistics and/or operations for conducting a direct-to-consumer e-commerce retail business. The logistics and/or operations system of the present invention may be used in connection with any online or e-commerce retail sector, including, for example, but not limited to, food retail (i.e., grocery retail), electronics, home goods, books, clothing, and shoes.

20 Claims, 13 Drawing Sheets

(56) References Cited

U.S. PATENT DOCUMENTS

| | | | | |
|---|---|---|---|---|
| 2002/0178016 | A1 | 11/2002 | McLellan | |
| 2002/0184497 | A1* | 12/2002 | Gage | G06Q 30/0283 713/168 |
| 2003/0025590 | A1* | 2/2003 | Gokcebay | G06Q 40/04 340/5.73 |
| 2003/0126023 | A1* | 7/2003 | Crampton | G06Q 30/0601 705/22 |
| 2004/0005051 | A1 | 1/2004 | Wheeler et al. | |
| 2004/0093793 | A1 | 5/2004 | Mori et al. | |
| 2004/0153207 | A1 | 8/2004 | Peck | |
| 2005/0068178 | A1* | 3/2005 | Lee | G06Q 30/06 700/214 |
| 2005/0216384 | A1* | 9/2005 | Partlow | G06Q 40/06 705/35 |
| 2005/0286808 | A1* | 12/2005 | Zimmerman | B65D 81/2038 383/105 |
| 2006/0020366 | A1* | 1/2006 | Bloom | G06Q 20/00 700/226 |
| 2006/0237427 | A1 | 10/2006 | Logan | |
| 2007/0227913 | A1 | 10/2007 | Shoenfeld | |
| 2008/0065262 | A1 | 3/2008 | Gottlieb et al. | |
| 2008/0228316 | A1 | 9/2008 | Stevens et al. | |
| 2009/0248218 | A1* | 10/2009 | Dyrmose | F25D 29/003 700/300 |
| 2011/0196710 | A1 | 8/2011 | Rao | |
| 2011/0253238 | A1 | 10/2011 | Burkhart, Sr. et al. | |
| 2012/0089248 | A1* | 4/2012 | Biba | G07F 11/62 312/348.3 |
| 2012/0216252 | A1 | 8/2012 | Skaaksrud et al. | |
| 2012/0265561 | A1* | 10/2012 | Patro | G06Q 30/06 705/26.61 |

OTHER PUBLICATIONS

Cook, John, "Amazon Locker turned on at 7-Eleven: Anyone using it yet?" Sep. 9, 2011, geekwire.com, 6 pages. (Year: 2011).*

* cited by examiner

COMPUTER-IMPLEMENTED PROCESS FOR IMPROVED DELIVERY OF COMMODITIES TO CONSUMERS

INCORPORATION BY REFERENCE

This application claims priority to U.S. patent application Ser. No. 13/610,768, filed on Sep. 11, 2012, which claims the benefit of U.S. provisional application Ser. No. 61/533,222, filed Sep. 11, 2011 and claims the benefit of U.S. provisional application Ser. No. 61/547,752, filed Oct. 17, 2011 each of which are incorporated herein by reference in their entireties. In addition, all documents cited or referenced herein and all documents cited or referenced in the herein cited documents, together with any manufacturer's instructions, descriptions, product specifications, and product sheets for any products mentioned herein or in any document incorporated by reference herein, are hereby incorporated by reference, and may be employed in the practice of the invention.

BACKGROUND OF THE INVENTION

1. Field of the Invention

The present invention relates to computer-implemented methods for direct-to-consumer distribution of commodities, in particular, to perishable commodities, and to the component devices of such methods. In a particular aspect, the invention relates to improved computer-implemented methods for direct-to-consumer distribution of food items and to the component devices that facilitate such distribution.

2. Background

In today's Western society, consumers face an ever-increasing choice in the manner in which to shop and purchase goods and commodities, in particular, given the near universality of internet communication devices, such as, personal computers and smart phones, from which one may conduct internet-based commerce, or electronic commerce (e-commerce). For many, ecommerce opportunities offer the convenience of shopping from home.

E-commerce enables businesses to sell their products and services directly to the consumers without establishing a physical point of sale. While some products can be delivered digitally to households (for example, newspapers, airline tickets and music CDs), most products purchased online ultimately must be transported to the end-users in the physical world. An efficient and reliable delivery system is essential for gaining customer loyalty online and consequently obtaining profitability, home delivery is increasingly becoming a key element in ecommerce. The logistical requirements of supply chains that extend to each customer's address may stimulate greater complexity in distribution systems management, potentially causing higher costs in carriers' fleet operations. An increase in time-sensitive goods results in an increase in the number of delivery vehicles. More frequent home-based local deliveries will likely add to traffic congestion and environmental problems in urban areas, making it more difficult for carriers to meet customer demands. These changes create challenges for the freight community.

Movement of products through a supply chain is necessary whether commodities are purchased via retail sales or via e-commerce. In traditional store-based commerce, goods are typically distributed in sequence from the manufacturer, to the wholesaler, to the retailer, and finally to the customer, although the distribution of goods varies, depending on the type of business. A relatively large share of the distribution of goods has occurred through distribution centers, owned by producers, wholesalers or logistics service providers. From a distribution point of view, retail shops function as the end points of the distribution chain that a delivery carrier involves. The customers mostly have to take care of the 'last-mile' transportation of goods, i.e. delivery from the physical point of purchase to home, though in some cases such as large and/or heavy items, the end of distribution chain may be extended to the consumer's households.

However, this is not the case with e-commerce. As companies and consumers can easily make contact with more potential purchasers and suppliers, e-commerce has changed the shape of traditional supply chain. Products purchased on line must be transported from a plant or distribution center directly to customer's home timely and reliably regardless of shipment size. This implies that e-commerce generates a different need for the transportation of goods from traditional delivery practices.

The distribution of goods to retail shops mostly involves the frequent delivery of packaged units, consisting of one or more boxes, pallets, or containers, filled with a number of homogeneous goods. In contrast, ecommerce delivery has usually only one (relatively small) item for each address. Even though there may be some level of bundling, it consists of the bundling of very different goods for one region, but the goods are not packaged together. Therefore, delivery of e-commerce goods requires a different service from that of traditional freight transportation.

Recently, e-commerce has moved into the area of home delivery of food and grocery commodities. When e-commerce was first recognized as a sea change in business, many companies tried to enter the realm of online grocery. But many of these pioneers failed when the Internet bubble burst, and in the decade since, online grocery sales have grown much slower than the overall e-commerce market. However, more recently, online retailers have become more widespread and prevalent, in particular, in higher density populations. This area of e-commerce presents specialized issues due to-the perishable nature of food and the strict requirements for temperature and other environmental controls to be imposed during the course of delivery to the customer.

Online food retailers generally use one or any combination of four approaches to distribute grocery orders to customers. Some retailers, offer more than one approach. The following describes the on line grocery approaches of some of the more established retailers.

Shadow warehouses (pickup). The shadow warehouse approach requires online shoppers to collect their orders at a drive-through pick-up warehouse. The advantage of the drive-through pickup is the time savings-online shoppers can often collect their groceries without having to get out of their vehicles. However, the pick-up sites are geographically limited and likely may not be nearby any given online consumer, therefor making the process impractical. In addition, the absence of personal contact can hamper both marketing and customer service efforts.

Shadow warehouses (home delivery). Similar to the first approach, home delivery managed from a central distribution center is frequently used by pure online retailers that do not have traditional retail stores. It is common in the United States, where Peapod (founded in the United States in 1989 and now owned by Netherlands-based Ahold), FreshDirect, EfoodDepot, and Netgrocer have made a business impact. This approach is moving forward in Europe, too, led by Switzerland's LeShop, which has partnered with the Swiss postal service for delivery, and the U.K.'s Ocado. Even traditional retailers that offer home delivery, such as Tesco, are opening centralized shadow warehouses to benefit from more efficient picking and delivery. The efficiency and time-saving features of this approach can be valuable to customers, but the level of customer service involved can also make it comparatively expensive. Included in this expense is the limitation on the number of customers that can be serviced during any given delivery period given various limitations that include delivery truck or vehicle space.

Store-based (pickup). This business model allows customers to pick up pre-ordered, pre-packed groceries from traditional retailer outlets. Publix and Albertsons in the United States have abandoned store-based home delivery in favor of pickup. This approach is easy for traditional grocery retailers to adopt within their existing structures. But customers often see little difference between online and offline channels and, ultimately, may prove unwilling to pay a premium for the service. When moving into the online business, traditional food retailers often choose to offer both click-and-collect and home delivery from their stores.

Store-based (home delivery). Traditional retailers entering the online business often take advantage of their retail outlets and pick customers' products for delivery from their existing stores. The U.K.'s Asda uses this approach, while others such as Sainsbury's, Simply Market, Colruyt, and Delhaize offer in-store picking and click-and-collect. In-store picking is waning in popularity among retailers because of delivery inefficiency, costs, and availability. Furthermore, trade chains are encountering local competition; for example, in many countries, including the United States, it is already common for some single-location stores to offer home delivery in two hours.

The supply chain for online food retailers is markedly different from all other online products, given that each order consists typically of a large number of small cost items, substitutability may be required when filling orders, delivery requires controlled environments from start to finish, and delivery accuracy and time are important so that the correct consumer is reached, and at a time when they are available at home to receive the goods, many of which are perishable. Many consumers today see value in home delivery and being able to conduct e-commerce with online food retailers; however, the existing approaches regarding logistics and operations currently used do not maximize costs reductions. This is particularly true and holds the most impact in low income districts, in which home delivery of food retail is economically not available to most. It is often the case, too, that low income regions would benefit most from having affordable home delivery of online food retail because having such a system in place would allow improved availability of good, healthy, sustainable foods. In addition, home food delivery options that are able to integrate the distribution of locally-grown farm foods and vegetables would also be a great improvement to any community, and in particular, those communities which are economically disadvantaged, such as "food deserts," which are generally low income districts having no large food retailers in operation to supply healthy, sustainable food.

Improved logistics and/or system of operations is desired in the art to enable a more affordable, cost-effective, and efficient systems of home food delivery of food and locally-grown farm produce and products via online retailers which are affordable to those individuals of any economic demographic.

It is further desired that such an improved logistics and/or system of operations may be applied to any area of consumer e-commerce outside of the food retail industry, including in other retail categories such as electronics, home goods, clothing, books, and many others. While online retail shopping has garnered a mainstream adoption, the consumer nevertheless still faces a tradeoff between, on the one hand, lower prices, better selection, and convenience of e-commerce, with on the other hand, the immediate availability of products with onsite retail. A system of logistics which eliminates this tradeoff to facilitate an e-commerce experience having all of these consumer benefits is highly desired in the art.

SUMMARY OF THE INVENTION

The present invention relates to an improved method of logistics and/or operations for conducting a direct-to-consumer e-commerce retail business. The logistics and/or operations system of the present invention may be used in connection with any online or e-commerce retail sector, including, for example, but not limited to, food retail (i.e., grocery retail), electronics, home goods, books, clothing, and shoes.

An object of the logistics and/or operations system of the invention is that regardless of the sector of e-commerce (e.g., food retail or consumer goods), moving goods along the supply chain from seller into the hands of the consumer will benefit from increased efficiency because, in part, the throughput of product deliveries to consumers will be increased or maximized.

A related object of the logistics and/or operations system of the invention is that regardless of the sector of e-commerce, both the seller and the eventual consumer will be able to conduct business with improved flexibility and with lower costs because deliveries of the purchased products (e.g., food retail, electronics) can be made to the consumers by the sellers with fewer or no time constraints, and can be conducted on a larger-scale, e.g., 10-fold, 20-fold, 100-fold, or more deliveries per day, than using current systems of logistics for getting e-commerce goods to customers.

Another object of the invention is to provide a logistics and/or operations system for conducting e-commerce in any retail sector, e.g., food retail, which has less of an impact on the environment as compared currently used systems of logistics and/or operations for e-commerce transactions.

Accordingly, in one aspect, the present invention provides a logistics and/or operations system for use in connection with e-commerce, and specifically for moving consumer-placed orders through the supply chain beginning in the fulfillment facility through the point at which the orders are delivered to the consumer in a manner that is substantially more efficient having greater throughput and lower cost as compared to using standard-industry logistics.

In an embodiment, the logistics and/or operations system of the invention begins with a customer placing an order for consumer products (e.g., retail food). In a preferred embodiment, the order is placed using a computer-implemented device that is connected to the internet, e.g., a web browser on a personal computer or smart phone, or using a smart phone application. Orders may also be placed using other means of communication, including telephone, fax, or mail. Once the seller has received the customer's order, a delivery is scheduled. The customer may continue to make changes to the items of their order, or modify the scheduled delivery, until the order enters the fulfillment process Next, the order is prepared or fulfilled at a fulfillment or distribution center. The fulfilled order, together with a plurality of other fulfilled orders, are then transported to a product distribution location and the order is deposited in the product pick-up device. In particular, the order is placed inside or otherwise secured within a space, compartment, drawer, or the like, the access to which is under the control of the customer. The product distribution location can be geographically situated nearby a customer, e.g., in the customer's neighborhood, street corner, town hall, or otherwise place of mutual convenience to a set of customers or potential customers.

The customer may then pick up their order directly by physically accessing their space or compartment in the product pick-up device. In an alternate embodiment, the order may be further transported from the product pick-up device to a customer's residence, home, or work site by a local courier service, e.g., bicycle courier, or the like.

An advantage of the present system of logistics and/or operations-whether used for food retail e-commerce or in other retail areas—is the enhanced capacity to substantially amplify the throughput of the supply chain from distribution center to customers' hands through the benefits of utilizing the product pick-up device. The integration of the product pick-up device into the logistics and/or operations system of the invention enables a large plurality of orders to be serviced to customers at one time, e.g., during the course of a single delivery route for a single delivery truck or courier. For instance, a product pick-up device having 10, 15, 20, 25, 30, 35, 40, 45, 50, or even up to 100 or more customer-specific spaces or compartments would amplify and/or increase the throughput of the supply chain by up to 10-fold, 15-fold, 20-fold, 25-fold, 30-fold, 35-fold, 40-fold, 45-fold, or 50-fold or even up to 100-fold or more as compared to current logistics which operate by delivering ordered goods directly to a customers' home, work, or residence. This aspect substantially drives efficiency up and costs down. In addition, this aspect provides greater flexibility to the seller in terms of scheduling and managing deliveries, and to the ultimate consumer, in terms of having the flexibility as to when the customer wishes to pick up their order, e.g., the customer does not need to be situated at home within a certain "window" of time in order to receive the order.

Another advantage to the logistics and/or operations system of the invention is that because a substantially greater-fold of customers may be serviced on any given single delivery route, the delivery trucks or vehicles may extend their delivery routes to greater distances, thus capturing an expanded territory and a greatly enhanced base of possible customers. Further, over this expanded territory, delivery vehicles may pick-up items for integration into the sales pipeline and order fulfillment process. As this applies to food retail, locally-grown foods may be picked up from farms and other sources, in order integrate the locally-grown goods into the order fulfillment process. These locally-grown goods can either be fulfilled along the delivery route directly in the delivery vehicle, or while the orders are being delivered to any given applicable product pick-up device. In addition, the locally-grown goods can be returned to the fulfillment center for use in fulfilling subsequent orders with locally-grown product components.

Integrating the local picks ups with the fulfillment process has the benefit of being able to deliver maximally fresh locally grown goods during the course of delivery.

Accordingly, in one aspect, the invention relates to a computer-implemented process for efficiently delivering a plurality of orders of products to a plurality of customers located substantially within a single geographical region comprising:

(a) obtaining a plurality of product orders from a plurality of customers located within a single geographical region, wherein the product orders are made by customers using a computer-implemented device,
(b) fulfilling the plurality of product orders with inventory from a fulfillment facility;
(c) sorting the inventory into a container corresponding to a customer's order;
(d) packing the containers onto a delivery vehicle;
(e) transporting the containers on the delivery vehicle to a waypoint distribution site located in the single geographical region, wherein the waypoint distribution site comprises at least one distribution device including a plurality of compartments;
(f) transferring a container from the delivery vehicle to a compartment of the distribution device which is accessible to the customer;
(g) repeating steps (e) and (f) until each of the orders have been delivered.

The single geographical region can be a county, a city, a town, a village, a borough, a neighborhood, a city block, or a food desert.

The computer-implemented device can be a personal computer.

The computer-implemented device can be a mobile device.

The computer-implemented device can be connected to the internet.

The single geographical region can include between about 1 and 50,000 people, or between about 1 and 25,000 people, or between about 1 and 10,000 people, or between about 1 and 5,000 people, or between about 1 and 1,000 people, or less than 1,000.

The step of fulfilling the plurality of orders can be done with a computer-implemented device in order to track the status of the orders.

The step of fulfilling the plurality of orders can include the further step of substituting inventory with suitable replacements as needed.

The sorting step can be conducted with a computer-implemented device in order to track the status of the orders.

The packing step can involve placing the containers corresponding to the customer orders onto the delivery vehicle in an order corresponding to the delivery order.

The distribution device can further comprise one or more environmental regulation or monitoring devices. The environmental regulation or monitoring devices can be selected from the group consisting of a thermosensor, a humidity sensor, a thermometer, a pressure sensor, and a light sensor. The environmental regulation or monitoring device can be operated or be controlled by a computer-implemented device either locally or remotely to control and regulate the environment of the compartments of the distribution device.

The compartments of the distribution device further can comprise a security means to regulate access by customers. The security means can be a lock, card swiper, computerized key pad, retinal scanner, finger print scanner, voice activated scanner, or traditional lock.

The over process can also include the step of picking up locally-grown food items during transit and optionally fulfilling orders with same.

In another aspect, the invention relates to a distribution device, as exemplified in the Figures, and which can comprise a main body having a plurality of compartments therein, each compartment being suitable to receive and store a customer order, wherein the plurality of compartments each further comprise a security means for selective access to a customer, and an environmental sensor for regulating and controlling the internal environment of the compartment.

These and other embodiments are disclosed or are obvious from and encompassed by, the following Detailed Description.

BRIEF DESCRIPTION OF THE DRAWINGS

The following detailed description, given by way of example, but not intended to limit the invention solely to the specific embodiments described, may best be understood in conjunction with the accompanying drawings.

DETAILED DESCRIPTION OF THE INVENTION

Figure 1:
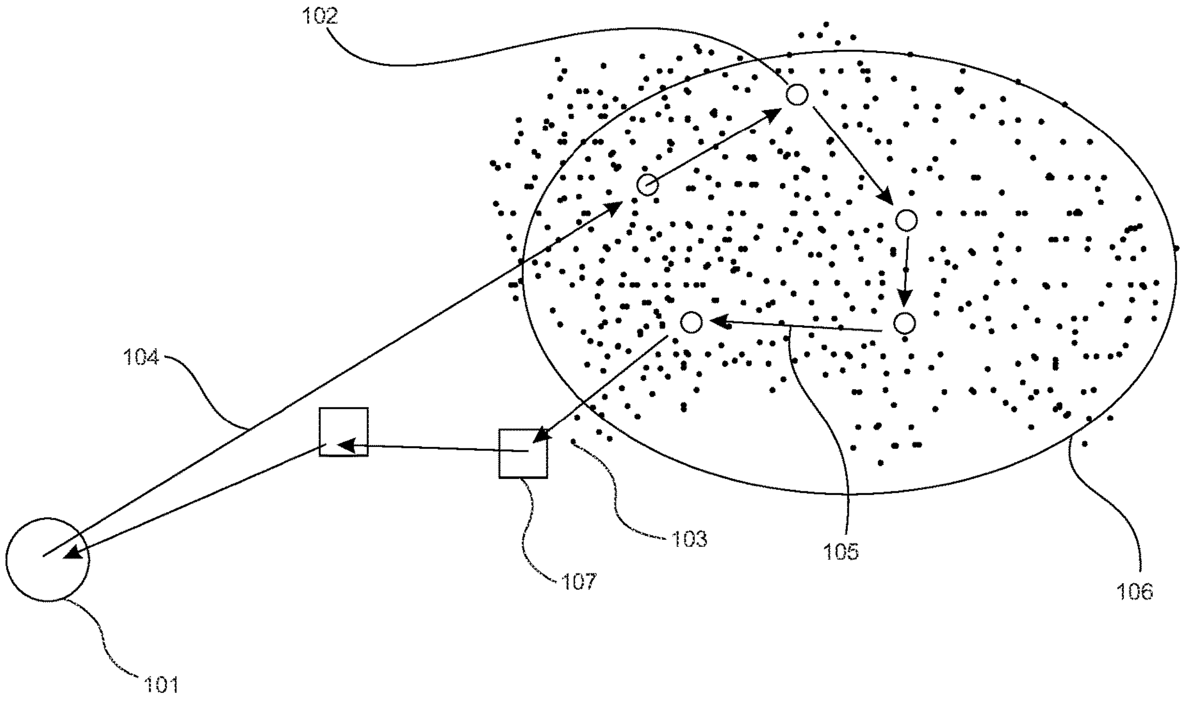
FIG. 1 is a schematic view of one embodiment of the logistic of the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural, and system changes may be made without departing from the spirit and scope of the present invention. The following detailed description is, therefore, not to be taken in a limiting sense, and the scope of the present invention is defined by the appended claims and their equivalents.

A new and useful system of logistics and/or operations for fulfilling customer orders of retail products and/or food and delivering said orders to the customer via a distribution system that employs geographically-specific distribution centers that include a product pick-up unit (i.e., product kiosk, product pick-up device, product depository device) to which a plurality of customer orders may be delivered, and from which a plurality of customers may independently or together retrieve their orders. In certain embodiments, the product depository devices include various devices and mechanisms, e.g., onboard computers, thermostats, humidifiers, dehumidifiers, heaters, air conditioning units, that allow the local environment of the product depository devices, and in particular, the specific environment in each compartment or space to which an order is stored or placed until customer pick-up is complete, to be regulated locally or remotely by a computer-implemented device. In other embodiments, each order along the entire logistics process, includes various monitoring devices, e.g., thermosensors, that allow the moisture and temperature and other sensors sufficient to measure and ascertain the precise environment local to the order itself at any point along the logistic. Such monitoring and measuring may be done remotely or locally via computer-implemented devices.

The system of logistics and/or operations of the present invention, in one embodiment, is particularly suited for improving the process of e-commerce in the food retail sector, i.e., where a food shopper seeks to place a food or grocery order using a computer-implemented device (e.g., a personal computer or mobile device connected to the internet) and requests the order to be delivered directly to their home or place of work. Current systems for online food retail services where ordered food is delivered to the home have numerous disadvantages, including. (a) lack of flexibility from the standpoint of the consumer because the consumer will need to plan an appropriate time to receive the order at the designated delivery site (e.g., home), (b) lack of flexibility from the standpoint of the seller or food retailer because the food retailer needs to conduct accurate scheduling of multiple orders executed by each delivery truck to the correct customers at specific times or time windows, resulting in higher costs; and (c) lack of throughput on the part of the retail seller because of time constraints imposed by limited delivery times and a limited number of stops feasible per day per delivery truck. These restrictions lead to inefficiencies (due to constraints imposed by time and customer convenience and/or requests, there are significant limitations on the total number of customer orders that can be processed per delivery truck), reduced capacity to handle increasing customer orders due to said restrictions, and ultimately higher costs. In the context of online food retailers, these problems are solved and overcome with the solution of the invention. Additional benefits stem from the present invention, too, including, for example: (i) capacity to integrate greater variety of locally-grown food sources during delivery phase due to the increased route distance that results from proceeding in accordance with the inventive logistics; (ii) improved benefits to the environment, e.g., fewer delivery trucks required relative to the number of customers serviced, i.e., the ratio of number of customers serviced to the number of delivery truck required to service said customers substantially increases by using the logistics of the invention versus standard logistics (e.g., retail-store-to-house delivery); integration of increased variety and quality of food retail by being able to integrate locally-grown foods; increased economic benefit to the farming community, which may introduce increased levels of locally-grown produce and food into the stream of commerce. Importantly, due to the reduced economic costs resulting from using the logistics of the invention, the present invention also benefits lower income sectors and "food deserts" (places having no actual local grocery stores or sources of healthy food) by making good, healthy readily available and with minimal additional costs, if any at all, other than the prices of the food products themselves.

Various terms having the same meaning may be used throughout the specification.

Specific terms are as follows.

As used herein, a "fulfillment center or site" refers to a building where product inventory is stored and where orders are fulfilled for consumers. Equivalent terms include "distribution center."

As used herein, a "waypoint site or location" or "waypoint pickup site or location" or the like refers to the geographical location, e.g., a neighborhood (e.g., nearby a cluster of mailboxes), a street corner, a community center, a church, or any equivalent location indoors or outdoors, whereby a "product pick-up device" is placed. Other equivalent terms for a waypoint site include a "product distribution location or site."

As used herein, a "product pick-up device" refers to the physical device which temporarily stores fulfilled orders until the point at which the customer picks up or retrieves her order therefrom. The "product pick-up device" may equivalently be referred to as a "distribution device" or a "product kiosk" or the like. In certain embodiments, the product pick-up device comprises a plurality of spaces or chambers which may be environmentally regulated by local (e.g., by rainwater cooling devices) or remote means (e.g., via computer thermosensors etc.) and which may be accessed by a customer in order to retrieve her order.

As used herein and in the appended claims, the singular forms "a," "and," and "the" include plural reference unless the context clearly dictates otherwise. Thus, for example, reference to "a kiosk" is a reference to one or more kiosks and includes equivalents thereof known to those skilled in the art, and so forth.

Referring now to the invention in more detail, FIG. 1 is a schematic view of one embodiment of the logistic of the present invention. The logistic scheme includes a point of origin 101. The point of origin 101 can include, for example, a warehouse or other order fulfillment facility or otherwise inventory storage site From the point of origin 101, a delivery vehicle (e.g., a delivery truck) travels along routes 104 to service a locality 106 (e.g., a city, town, neighborhood, county). Trucks travel between waypoint pickup locations 102 (depicted as open circles), obviating the need to travel between the substantially greater number of customer locations 103 (depicted as dots) (e.g., representing a customer located at a private residence, home, business, school, university, etc.). During transit, the truck may optionally source from local suppliers 107 (e.g., local farms, sources of locally-grown food). Locally-grown food picked up during transit may be used to fulfill certain orders on the vehicle itself just prior to delivery of orders to each waypoint pickup location 102 or to specific waypoint pickup locations 102. As can be seen visually from FIG. 1, each potential customer 103 may be serviced via a limited number of waypoint pickup locations 102 (in this case, 5 waypoint pickup locations), thereby directly increasing the efficiency of the logistics by maximizing or increasing the ratio of serviced customers to the number of delivery trucks. In other words, the waypoint pickup locations function as a temporary deposit site for placed orders for a plurality of customers, upon which at a later point access their order by accessing the product pick-up device (not shown in the figure, but each waypoint pickup location 102 would include at least 1 product pick-up device, but may include more than 1) at the waypoint pickup location 102 to obtain the purchased and delivered goods.

As an alternative embodiment, a customer could arrange to have a local courier pick-up the order from the waypoint pickup location and deliver the order to the customer, i.e., conduct a "last-mile" delivery, for a nominal additional fee. This option may be-suitable for the impaired or elderly.

Figure 2:
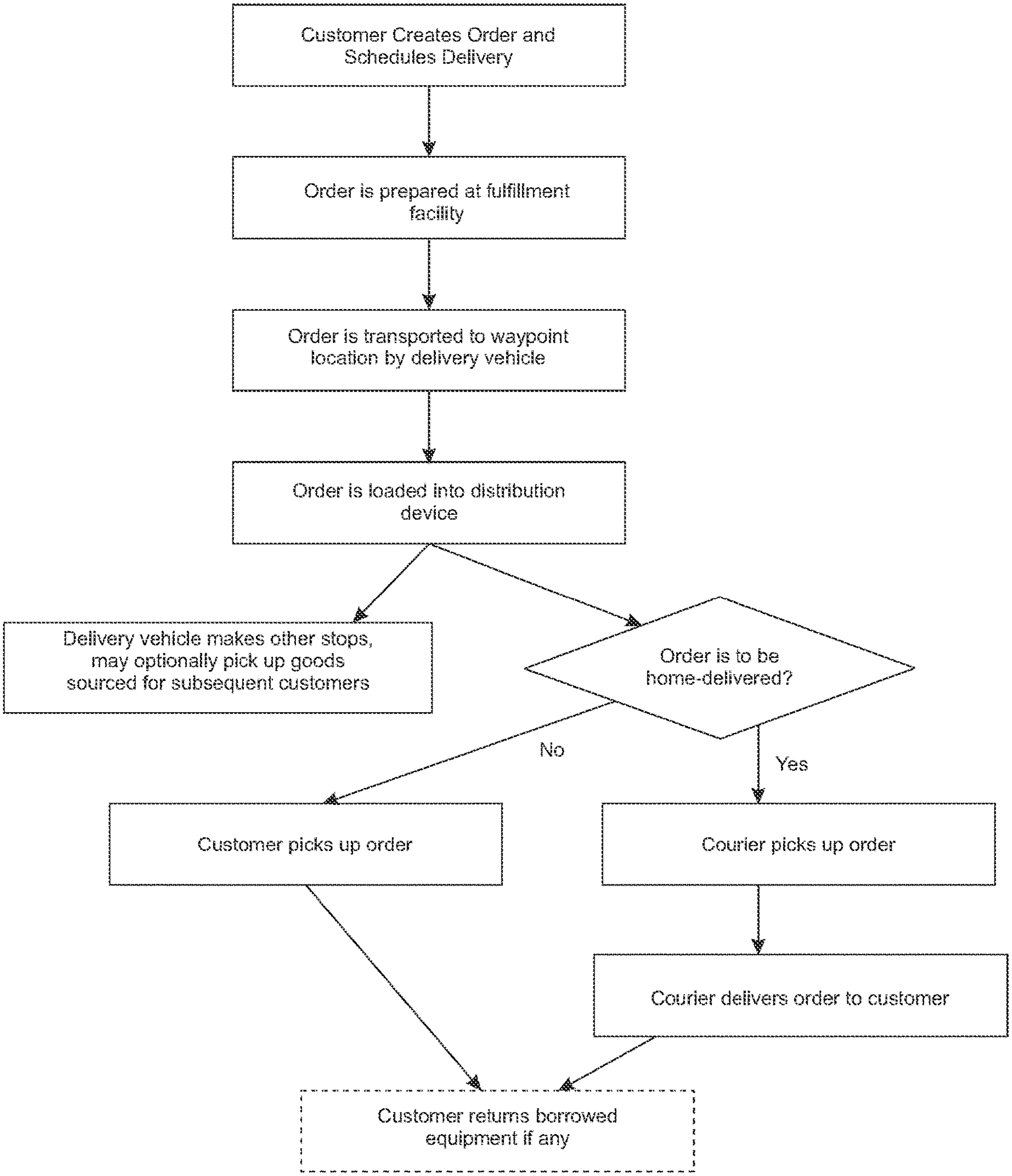
FIG. 2 provides a schematic in the form of a flowchart representing an overview of an embodiment of the logistic of the present invention, in operation from the point that the customer creates an order to the time the customer obtains their ordered goods.

Referring now to FIG. 2, a schematic is provided in the form of a flowchart representing an overview of an embodiment of the logistic of the present invention, in operation from the point that the customer creates an order and ending with that order being delivered to the customer. FIGS. 3-7 are exploded views showing specific steps of the logistic in more detail.

To help illustrate the logistic of the invention, the logistic is examined in the following narrative.

Bob places an order by scheduling a waypoint delivery and adding items to it. He is free to do this in any order, and may add/change/remove items and/or change or cancel the scheduled waypoint delivery right until his order enters the fulfillment process. In one embodiment, Bob is notified of the cutoff time after which he would no longer be able to modify his order.

The order system itself is preferably a computer-implemented order system, such as that described in U.S. provisional application No. 61/547,752, filed Oct. 17, 2011, which is incorporated herein by reference. In a preferred embodiment, the computer-implemented order system is connected to the internet and can be in the form of a personal computer or a mobile device (e.g., smart phone) which has an internet connection.

Bob also has the option of choosing to pickup his order himself from the waypoint pickup site, sending his own agent, or having the system select a courier to bring his order to him. He is free to change this selection even after the fulfillment of his order begins.

If Bob chooses waypoint pickup, he decides upon a set of people who are authorized to pick up his order, and provides information for the distribution device to authenticate them. In this case, Bob chooses his son Jake and enters Jake's credit card number. The system hashes Jake's credit card number using a one way function rendering the credit card number computationally irretrievable. Bob also chooses to authorize himself in case Jake forgets to pick up the order, and his hashed credit card number is retrieved from a previous waypoint delivery.

Sally is in a similar situation to Bob, except that she chooses to have her order brought to her by a courier selected by the system. She pays the additional fee, if any, and chooses the best delivery place/time for her. The system then automatically selects the closest available waypoint delivery and assigns a courier to bring her order to her. Sally similarly provides her credit card number, which is hashed, for authentication at the time of delivery if necessary Sally's order process follows similarly to Bob's as described below.

Bob further provides payment information if needed. Alternatively this information may be retrieved from his previously stored account information.

After the cutoff time associated with the waypoint delivery Bob selected, Fernando, a manager at the fulfillment facility, assigns Bob's order to a new wave and begins the fulfillment process. Bob can no longer make changes to his items of the waypoint delivery he scheduled, but he can choose to switch to delivery rather than waypoint pickup.

Fred, a picker in the fulfillment facility, receives a list of items belonging to the wave which are located in his section. The system directs him to pick these items in the order they appear throughout his section. In one embodiment, single LED lights underneath each product bin light up in sequence directing him to the next product, and an earpiece reads the quantity to pull. After pulling these items Fred actuates a button to advance to the next product, and the LED under the next product to pick now illuminates.

If any item is out of stock, Fred indicates this to the system, which either directs him to either pull an alternative product or credits the customer's account, according to the customer's wishes. If Fred is able to locate a suitable replacement, he scans the item, and this item is now associated with the customer's order. Any pricing adjustments may be made accordingly.

Once Fred has picked his items, he brings them to the sorting station assigned to the wave and confirms this with the system. Once all items for the wave have been picked and brought to the sorting station, the sorting process begins.

Sorting may be accomplished using a variety of devices and techniques. In one embodiment, a system of compartments is employed, underneath each of which is a single multicolor LED. Felix, one of the workers assigned to the sorting station, begins sorting the wave by scanning an item. The LED under the correct compartment is illuminated using the color previously assigned to Felix. His colleagues do the same and their compartments are illuminated using their colors. If any compartment is momentarily assigned to two workers, the LED alternately flashes their colors.

If Felix encounters an item that he cannot scan for whatever reason, he simply sets it aside. Once all items that can be scanned have been placed in their correct compartments, the system displays a list of products which have not been scanned. For each of these items on the list, Felix attempts to locate the item in the set-aside collection. If he is able to find the item, he indicates this to the system, and the system illuminates the proper LED. If not, he indicates this to the system, and the customer's account is credited.

Once the wave has been fully sorted into component orders, each order is packed by a team of packers. Francois, a packer, begins by scanning a compartment on the sorting station, and selecting and scanning an appropriately sized delivery container. Items may be packed together or separately depending on their environmental requirements (e.g. temperature, moisture content) or other considerations. Francois scans each of the containers he selects for the customer's order and the system associates it to their order electronically. Alternatively or additionally, he may label the containers physically. Environmental monitoring devices (e.g., a thermosensor, humidity sensor) may be added to any container, in which case Francois scans these devices to associate them to the container.

Once the orders are packed, they are routed to their appropriate staging area for loading onto a delivery vehicle, in the reverse order of the scheduled delivery route.

Steve, the driver of the delivery vehicle, preferably has a mobile device, to which is downloaded the scheduled delivery route, turn by turn directions, information on all orders to be delivered, as well as information on items to pickup locally for future customer orders.

Steve makes his first stop at a first waypoint pickup location, and begins by identifying himself to the product distribution device (or product kiosk system). All available compartments of the device open. Steve removes any empty delivery containers from the compartments, along with any previous orders that were not picked up. He then removes the orders from his delivery vehicle, scanning each container, until he reaches orders to be delivered to the second waypoint pickup location. This process is repeated until all orders have been delivered.

As he scans each container, his mobile device (or other suitable computer-implemented device) presents a list of the other containers belonging to that customer's order, as well as any preferences the user has expressed for the physical placement of their order. Bob is relatively tall, so he has expressed a preference to not have a compartment close to the ground. Steve chooses the best available compartment to match the order and scans it to associate the compartment to the customer's order, unless a compartment has been-pre-assigned by the system. As he scans subsequent containers belonging to that order, the system will remind him of the correct compartment to place them. If he runs out of room in any compartment, he scans another compartment to further associate this compartment to the customer's order.

Once all containers to be delivered have been loaded into compartments, Steve interfaces his mobile device or other computer-implemented device with the product distribution device, and transmits the list of orders along with identifying information. In this case, among this information are Bob and Jake's hashed credit card numbers.

Steve then secures all compartments and moves on to his next waypoint pickup site as directed by his computer-implemented device (e.g., mobile device), which may alternately be a location from which to pick up items for subsequent customer orders, such as a site location to pick up locally-grown food or produce.

When Steve returns to the warehouse, all empty delivery containers he retrieved are scanned, and the corresponding customers' deposits are refunded as needed. In addition, all locally sourced items Steve has picked up are recorded as inventory and routed to the appropriate location in the fulfillment facility.

As Bob might have predicted. Jake forgot to pick up the order on his way home, so Bob travels to the waypoint and slides his credit card into the distribution device to identify himself. His credit card number is passed through the same one way function as before to obtain the hash, and this hash is compared with hashes in the table of orders recorded by the distribution device His hash matches one of the two hashes associated with his order, so the distribution device verifies that the environmental sensors associated with his order (if any) are reading within proper tolerances, and if so the correct compartments open Bob removes his order. He has the option of removing his items from the containers and placing the empty containers-back in the compartments right away, but in this case he chooses to use the containers to bring his items home, and plans to return them a different day.

Sally's order proceeds slightly differently Tim, the courier assigned by the system travels to the waypoint and identifies himself to the distribution device. The device opens the correct compartments, and Tim's mobile device directs him as to where to deliver Sally's order. He may or may not need to authenticate Sally depending on the situation. Once he delivers her order, he marks it as delivered on his mobile device.

Figure 3:
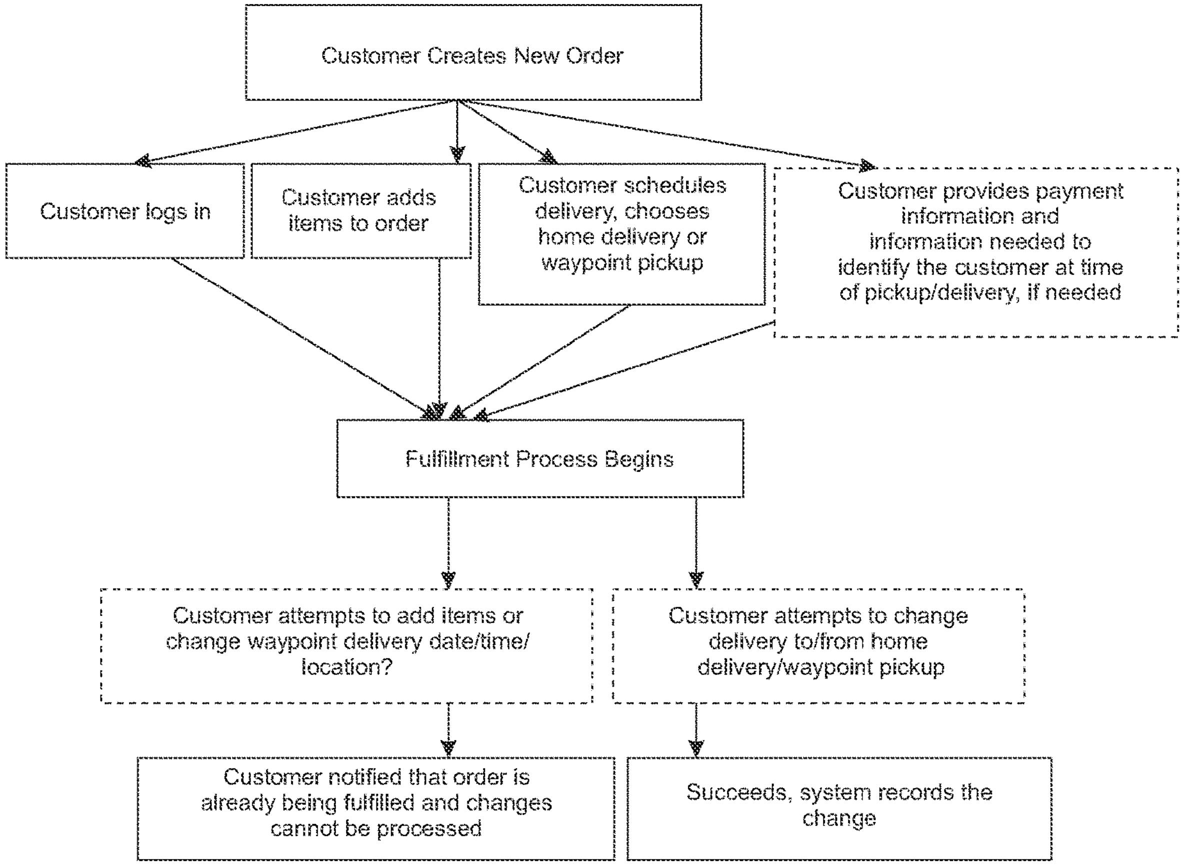
FIG. 3 provides a schematic in the form of a flowchart representing an embodiment of how a customer may place an order using a computer-implemented device (e.g., personal computer or smart phone connected to the internet), as a component of the logistic of the present invention.
Figure 4:
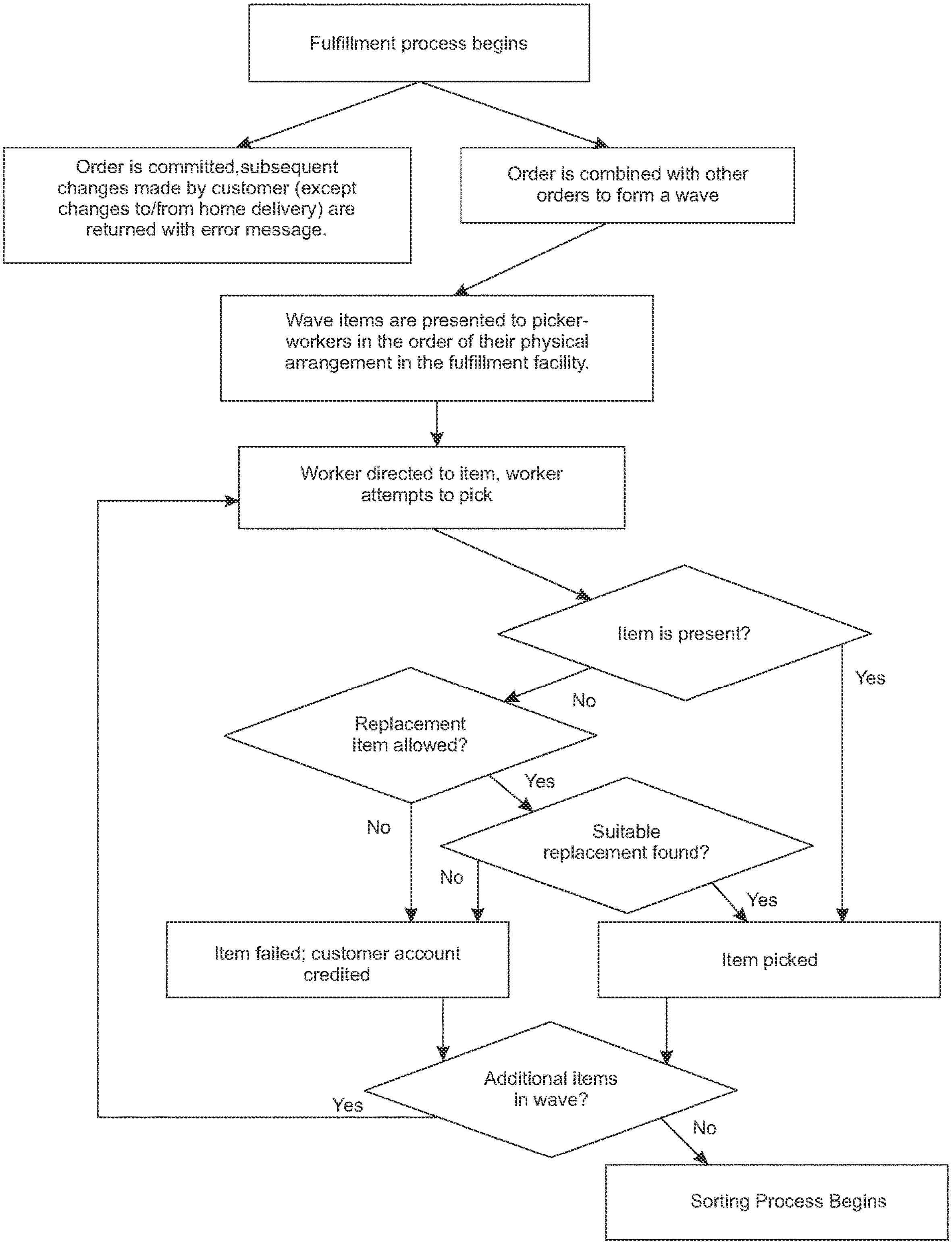
FIG. 4 provides a schematic in the form of a flowchart representing an embodiment of the fulfillment stage of the invention, as a component of the logistic of the present invention.
Figure 5:
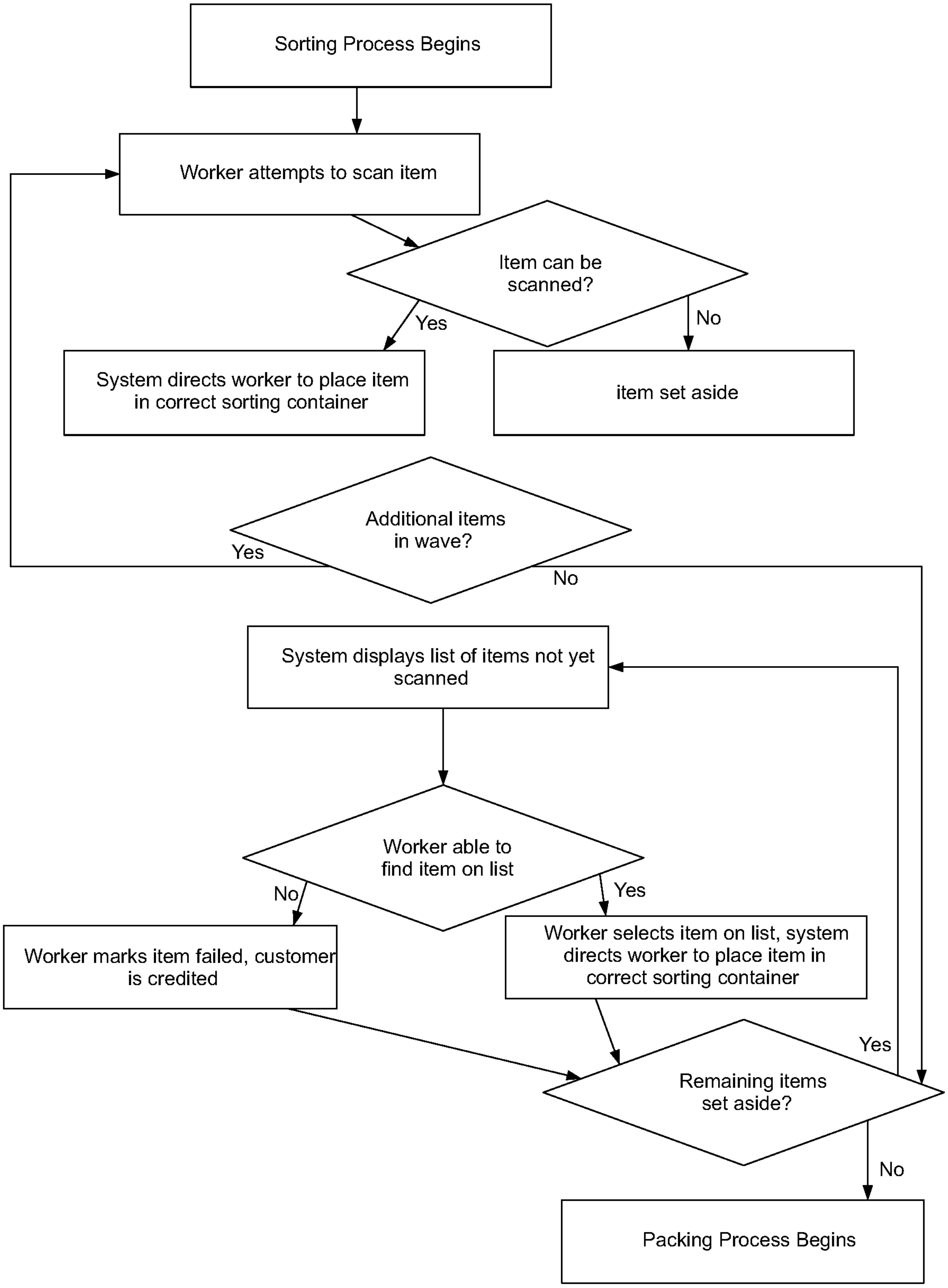
FIG. 5 provides a schematic in the form of flowchart representing an embodiment of the sorting stage of the invention, as a component of the logistic of the present invention.
Figure 6:
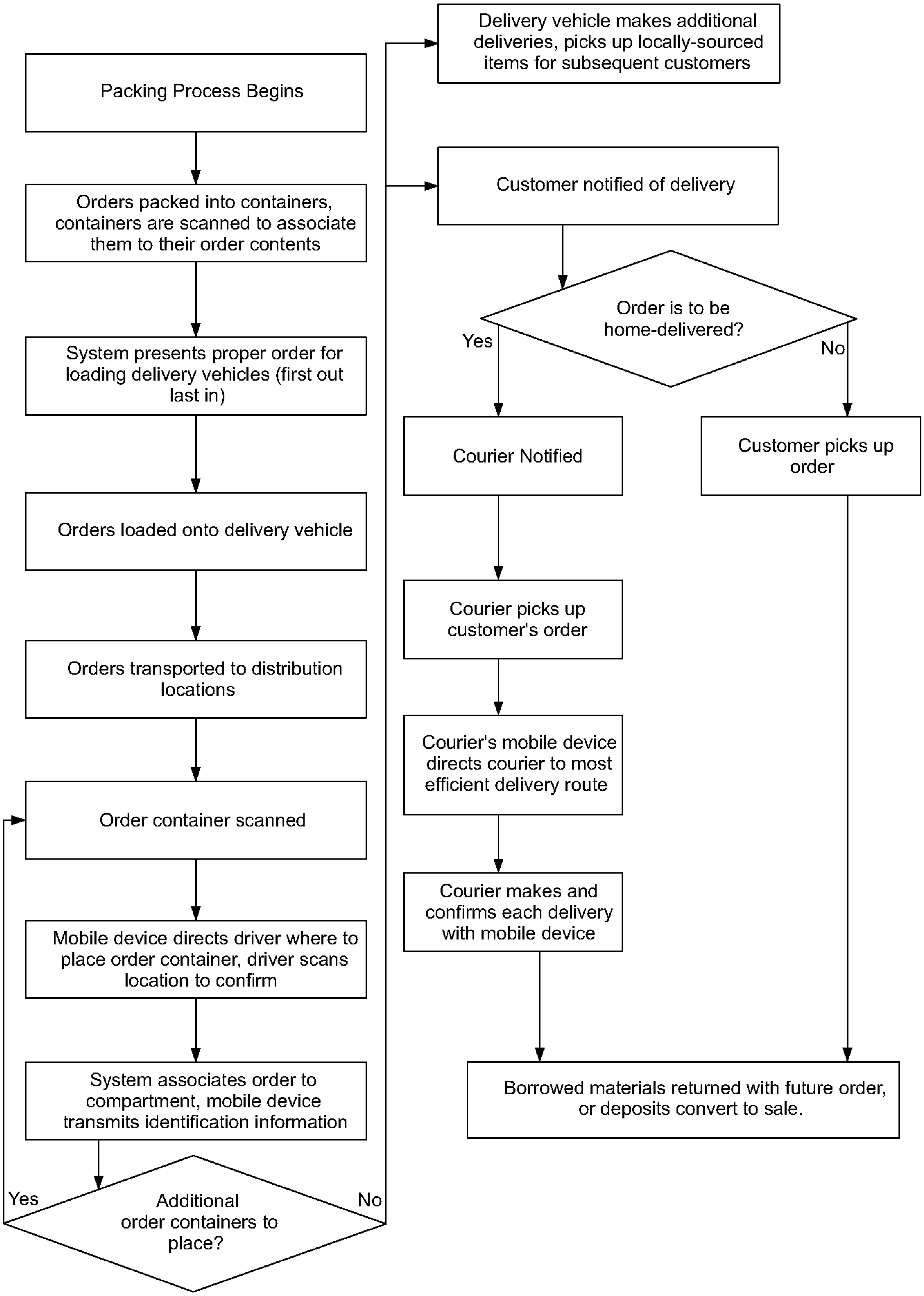
FIG. 6 provides a schematic in the form of flowchart representing an embodiment of the packing stage of the invention, as a component of the logistic of the present invention.
Figure 7:
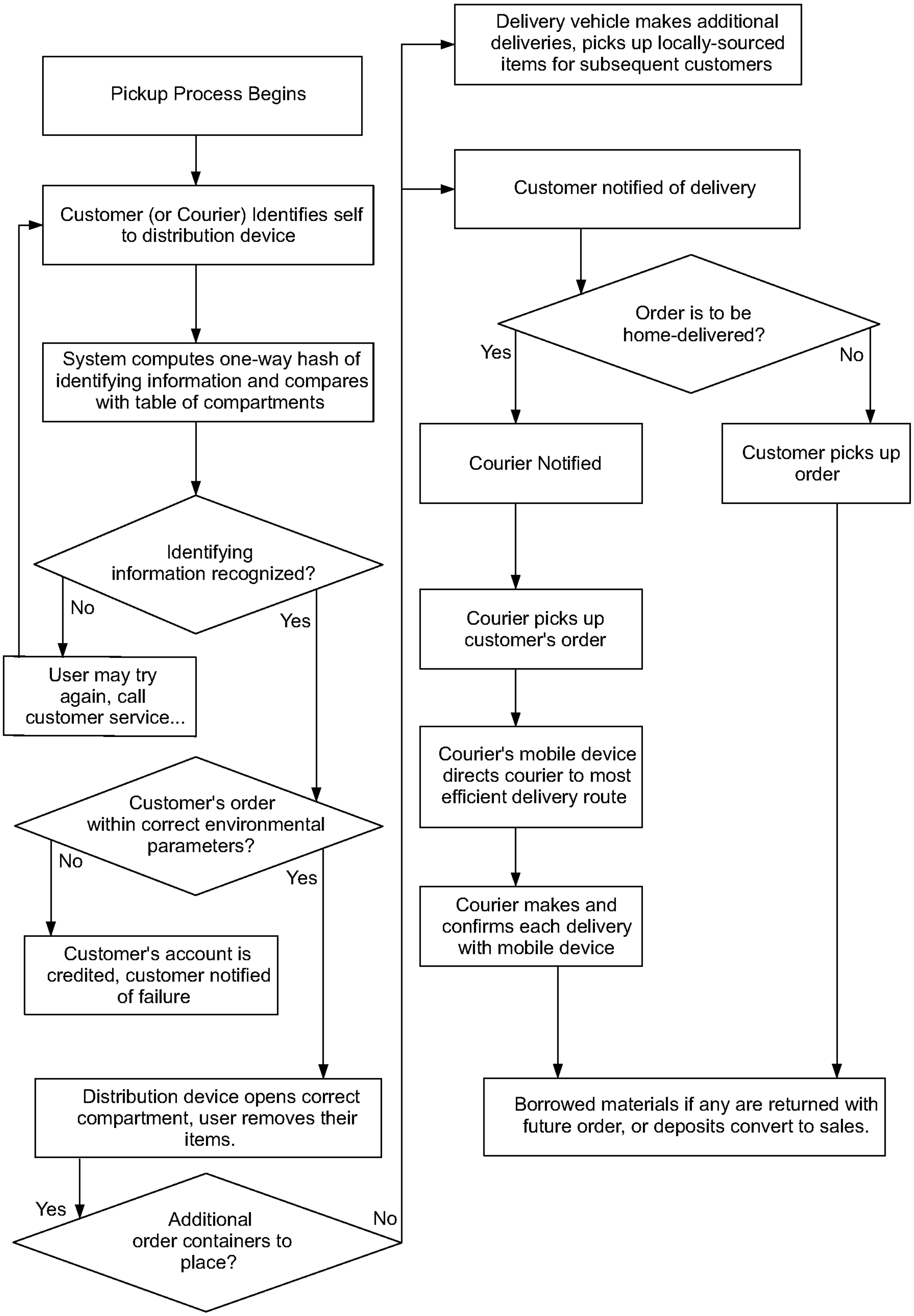
FIG. 7 provides a schematic in the form of flowchart representing an embodiment of the delivery stage of the invention, as a component of the logistic of the present invention.

This illustrative scenario involving the above characteristics corresponds to the flowcharts that summarize the logistics system of the present invention as depicted in FIGS. 3-7. More in particular, FIG. 3 provides a schematic in the form of a flowchart representing an embodiment of how a customer may place an order using a computer-implemented device (e.g., personal computer or smart phone connected to the internet), as a component of the logistic of the present invention. FIG. 4 provides a schematic in the form of a flowchart representing an embodiment of the fulfillment stage of the invention, as a component of the logistic of the present invention. FIG. 5 provides a schematic in the form of flowchart representing an embodiment of the sorting stage of the invention, as a component of the logistic of the present invention. FIG. 6 provides a schematic in the form of flowchart representing an embodiment of the packing stage of the invention, as a component of the logistic of the present invention. FIG. 7 provides a schematic in the form of flowchart representing an embodiment of the delivery stage of the invention, as a component of the logistic of the present invention.

The logistics system of the invention involves the use of one or more product pickup devices (or distribution devices) which are physically situated at the waypoint pickup location or site. The product pickup devices comprise a plurality of spaces or compartments in which the orders may be placed by the delivery people, and from which the customer may access and obtain their order at a subsequent timepoint. Preferably, each of the plurality of spaces or compartments comprise one or more security measures, such as, locks (e.g., digital locks that may be accessed by a swipable card or other similar electronic key/lock device), surveillance equipment to monitor those who approach the pickup device, and environmental control devices, such as thermosensors and humidity sensors, and computer-implemented devices for regulating, measuring, and changing the environment of the overall device and its compartments (e.g., changing the temperature or pressure or humidity level, or controlling airflow). Any conceivable variation in shape, size, material, and appearance, is contemplated, so long as the device may function as intended as a distribution device.

Figure 8:
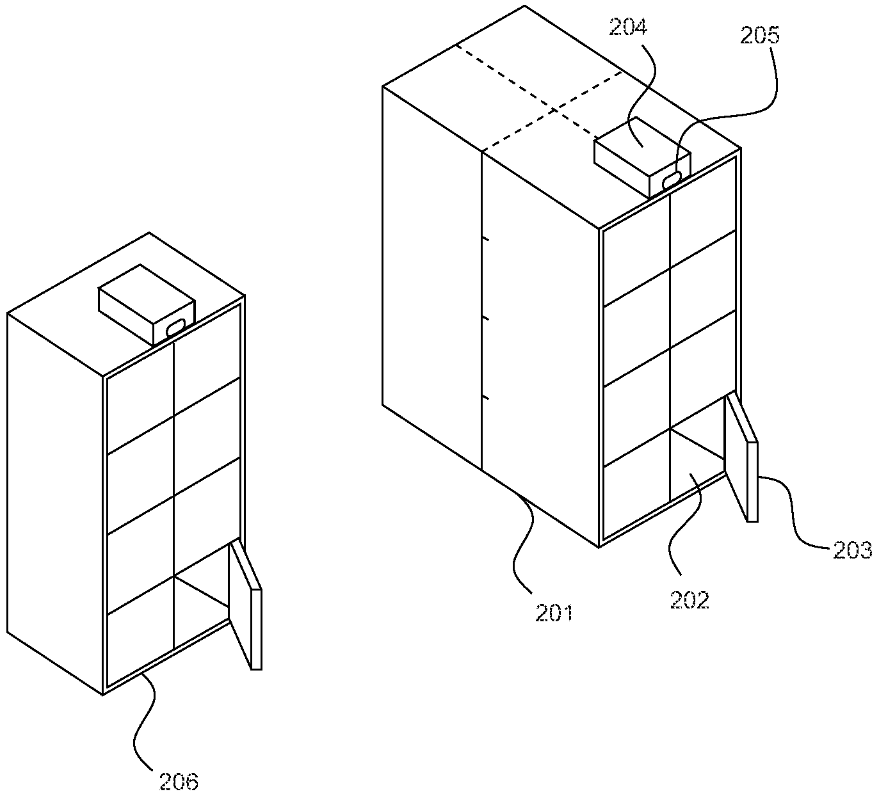
FIG. 8 provides a perspective view of an embodiment of the distribution device (also referred to as a "product pick-up device" and the like) of the present invention, which is placed or is physically situated at a waypoint site, or equivalently, a "product distribution location or site."

FIG. 8 provides a perspective view of an embodiment of the distribution device (also referred to as a "product pick-up device" and the like) of the present invention, which is placed or is physically situated at a waypoint site, or equivalently, a "product distribution location or site."

FIG. 8 shows two variations of distribution devices 201 and 206. Compartments 202 are depicted secured by doors 203, which in turn are locked/unlocked by electronic device 204 and human interface element 205.

In more detail, still referring to the invention of FIG. 8, human interface device 205 may for example be a credit card reader (i.e., a magnetic card reader) so that when a customer swipes their card, electronic device 204 may compare the card number with a stored value (optionally using a one-way function) to determine whether access should be granted and which compartment to open. In another embodiment, interface-device 205 may be a fingerprint reader, retinal scanner, touch screen panel, physical keypad, or microphone, camera, RFID receiver, or other radio transceiver (e.g., WiFi, Bluetooth, cellular, and so on). Furthermore interface device 205 may comprise a combination of these or other devices, and may additionally comprise a means to verify sobriety in the case that distribution device 201 is used to distribute alcohol, e.g., a cognitive testing device or a device measuring alcohol content in exhaled breath.

In further detail, still referring to the invention of FIG. 8, compartments 202 may or may not be sized uniformly, in order to accommodate the greatest number of simultaneous customer orders. Material selection may vary according to the goods being stored, e.g., in the case of food, compartments 202 may and doors 203 may be lined with thermal insulation.

Figure 9:
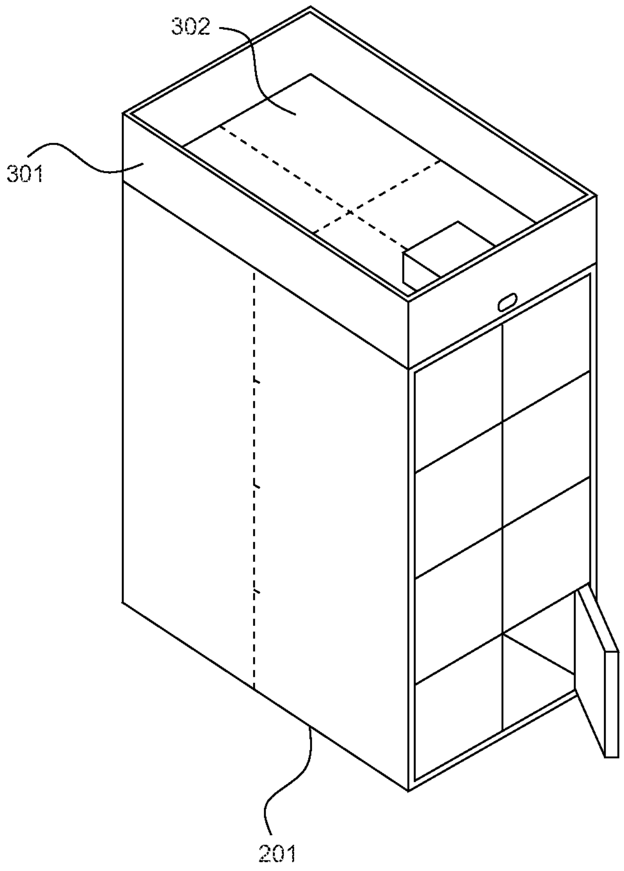
FIG. 9 is a further embodiment of the embodiment shown in the preceding figure, but modified to show a water retention device for the purpose of facilitating cooling of the device, or otherwise facilitating the regulation of the environment (e.g., moisture level, temperature).

FIG. 9 is a further embodiment of the embodiment shown in the preceding figure, but modified to show a water retention device for the purpose of facilitating cooling of the device, or otherwise facilitating the regulation of the environment (e.g., moisture level, temperature) As shown in FIG. 9, distribution device 201 is shown with a liquid (e.g., water) containing and collecting device 301 to assist with temperature management inside the distribution device. In particular, device 301 may house soil and plants to trap water and help regulate temperature inside distribution device 201.

The embodiment of FIG. 9 can be constructed so that containing and collecting device 301 is open to its top to permit evaporation to the air (e.g., as described above), or it may be closed to form part of an absorption refrigeration system.

Figure 10:
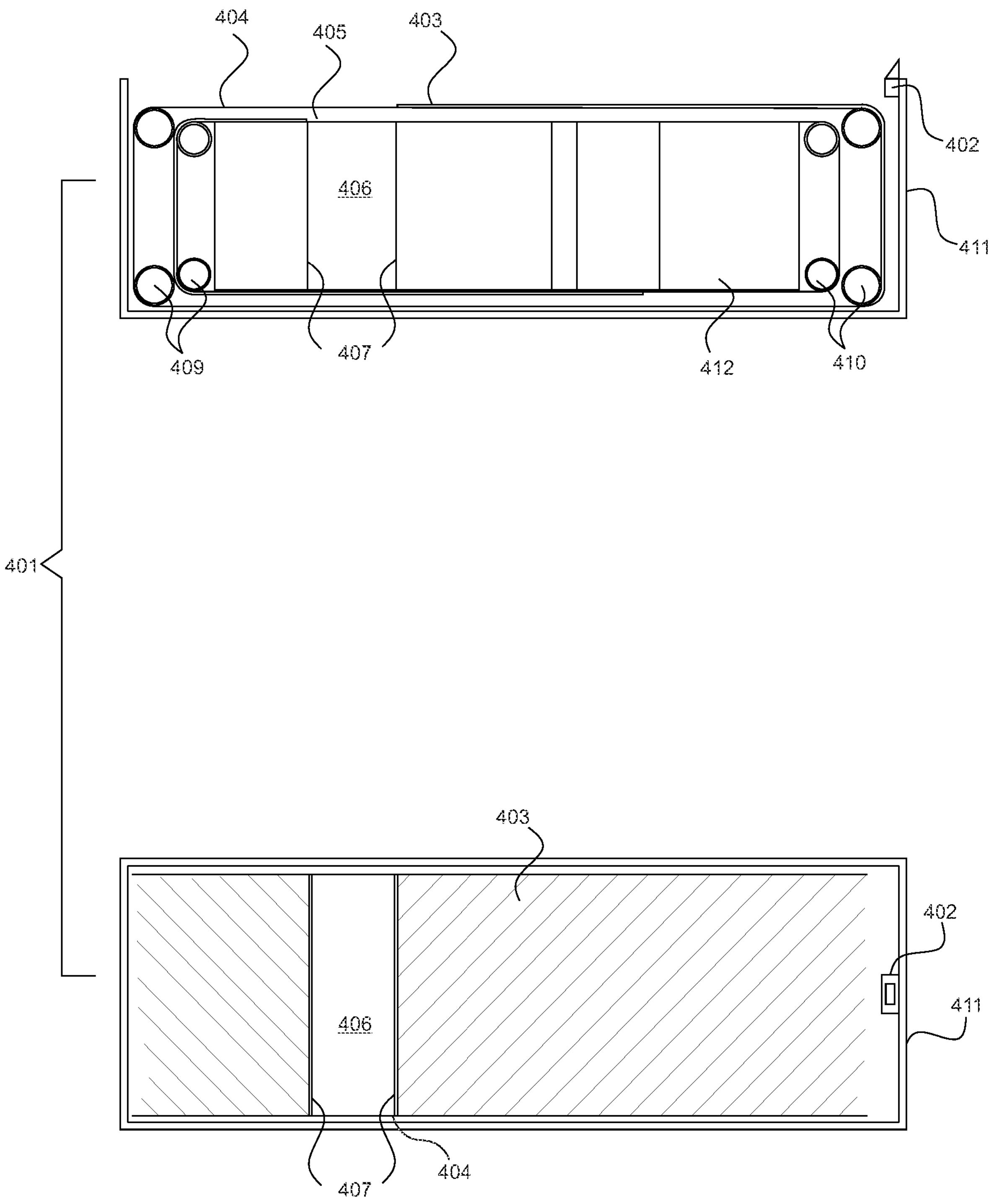
FIG. 10 is a side view of a particular space-saving design of a component of the distribution devices of the present invention (top image), and a top view of the same (lower image).

FIG. 10 is a side view of a particular space-saving design of a component of the distribution devices of the present invention (top image), and a fop view of the same (lower image). The upper image shows a space saving drawer 401 for use within distribution device 201 is shown in side view and top view respectively. Removable dividers 407 permit allocating available space as it is needed to store a maximal number of items of varying size. Blocking material 403 obstructs viewing and accessing goods located underneath, and is attached to tracks 404. Powered gears 409 and unpowered gears 410 move tracks 404 along their length which in turn move blocking material 403 to expose space 406 between dividers 407 while restricting access to goods stored in other compartments. Powered gears 409 measure movement of tracks 404 and work in concert with electronic device 204 pictured in FIG. 8 to precisely position blocking material 403 to grant access to and only to the desired compartment 406. Floor 412 is positioned above tracks 404 and blocking material 403 as it wraps around the underside of the compartments to prevent damage to goods as blocking material 403 is repositioned. Blocking material 403 can be repositioned while drawer 401 is fully inserted into collection distribution device 201 and latch 402 can be actuated to allow the drawer to be pulled out once the process is complete. This helps maximize the number of simultaneous customers each distribution device can support.

In one embodiment, the construction details of the device shown in FIG. 10 are such that blocking material 403 is rigid, visually opaque, and such that the assembly of blocking material 403, tracks 404, and gears 409 and 410 is resistant to tampering Tracks 404 might for example be constructed from metal drive-chain links, and blocking material 403 might be constructed from thin metal strips extending across the width of the drawer from track to track.

Figure 11:
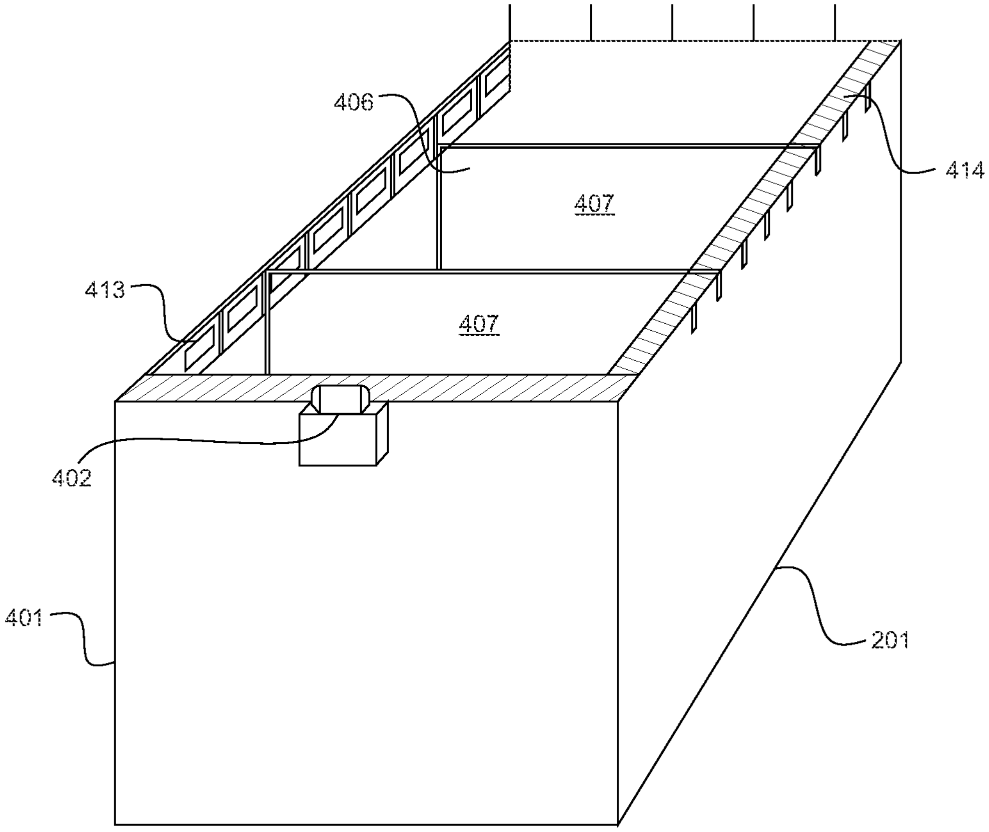
FIG. 11 is a side view of an embodiment of the distribution device of the present invention with the addition of one way valves to provide emergency air flow.

In FIG. 11, a perspective view of drawer 401 is shown partially protruding from distribution device 201. Blocking material 403, tracks 404, and gears 409 and 410 are not shown for clarity Markings 413—readable by machine and or human users are provided to denote the position of dividers 407 as they've been placed in drawer 401. Locking strip 414 placed over the edge to one side of dividers 407 can be secured to drawer 401 to prevent dividers from being removed or repositioned except by authorized workers. Markings 413 are used in conjunction with electronic device 204 pictured in FIG. 8 to record the position of dividers 407 and associate contents with compartments 406 created between the dividers.

Figure 12:
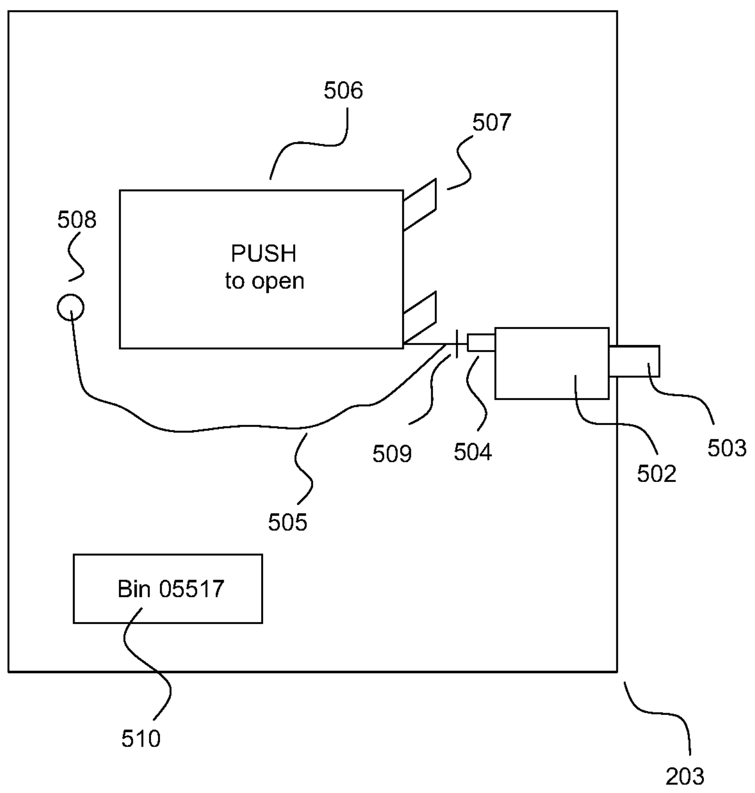
FIG. 12 is a front view of an embodiment of the invention, depicting the inside of the door to a compartment of distribution device of the present invention.

FIG. 12 is a front view of an embodiment of the invention, depicting the inside of the door to a compartment of distribution device of the present invention. The figure shows a front view of the inside of door 203 of distribution device 201 of the invention of FIG. 8. Button 506 attached to mechanical override 504 of lock 502 can be actuated from the inside by pushing it substantially toward the face of door 203 as permitted by hinges 507. Button 506 is ideally marked in a luminescent manner, e.g., using a phosphorescent marking to ensure it is visible even in the dark at least for some time (e.g., after the door is closed), or by using light emitting electronics. Furthermore, override 504 may be actuated from the outside by pulling cable 505 through opening 508 of door 203, and cable 505 may in turn be secured on the outside of door 203 by mechanical lock. Cable 505 may be housed in a sheath along its length (not depicted in the diagram separately from cable 505), the sheath being attached to opening 508 to prevent airflow through opening 508 into the compartment 202 covered by door 203.

Still referring to the embodiment of FIG. 8, FIG. 12 shows that lock 502 may actuate (i.e., retract latch 503) electronically or electro-mechanically in concert with electronic device 204. Marking 510 may be machine and/or human readable (e.g., it may employ barcode or RFID) to uniquely label each compartment of each distribution device 201. The contents of each compartment 202 may therefore be associated with compartment 202 in the memory of electronic device 204 via interface device 205, permitting electronic device 204 to open the correct compartment for each user of the device when that user is authenticated using interface 205.

Figure 13:
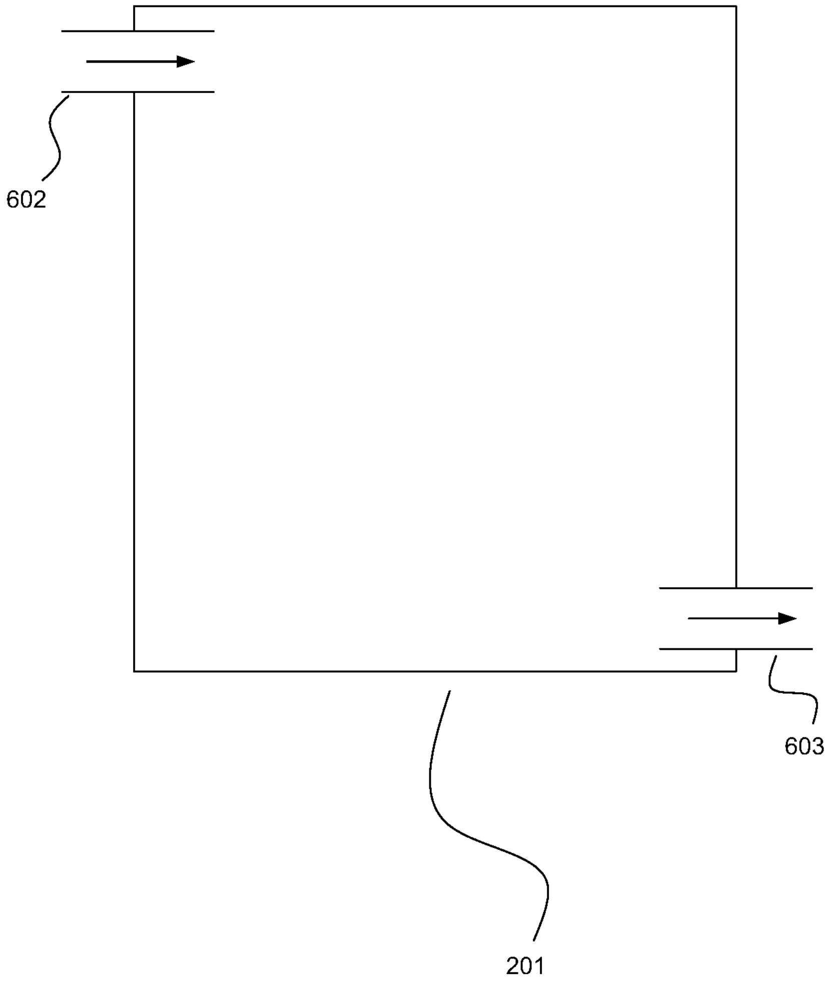
FIG. 13 depicts an embodiment of the distribution device of the invention showing the movement of air through the device.

FIG. 13 depicts an embodiment of the distribution device of the invention showing the movement of air through the device. The figure depicts a side schematic view of distribution device 201 as shown with the addition of an air intake one-way valve 602 and an air output one-way valve 603, to ensure that if an animal or person were to become trapped inside, fresh air is exchanged with the outside of device 201 when the animal or person breathes (and therefore causes pressure changes inside device 201), but in such a way that zero air exchange occurs otherwise.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiments, methods, and examples, but by all embodiments and methods within the scope and spirit of the invention.

Additional aspects of the invention may be understood by the following numbered paragraphs:

1. A process of delivering items for multiple recipients from a fulfillment facility to central pickup locations, from which multiple recipients may retrieve their items; and/or the process of retrieving items from central drop off locations, at which multiple senders may drop off their items.
2. The process of paragraph 1, wherein some or all of the pickup locations are generally unattended.
3. The process of paragraph 1, wherein certain additional items are retrieved from other locations during the process.
4. A distribution device comprising at least one compartment, such that each compartment may be secured and opened respective of the others
5. The distribution device of paragraph 4, facilitating the process described in paragraph 1.
6. The distribution device of paragraph 4, such at least one compartment is secured by a computer or software controlled lock.

6. A. The distribution device of paragraph 6, such that at least one lock may be mechanically actuated.

6. B. The distribution device of paragraph 4 such that electronic power is provided by solar panels.

6. C. The distribution device of paragraph 4 such that electronic power is provided by energy harvesting from electromagnetic waves.

6. D. The distribution device of paragraph 4 such that the device further comprises an exterior fascia suitable for outdoor placement.

6. E. The distribution device of paragraph 6D such that the device further comprises a slanting roof to prevent water runoff from interacting with the user.

7. The distribution device of paragraph 6, such that the computer or software may be reconfigured to grant or revoke access to each compartment.
8. The distribution device of paragraph 6, such that the computer or software may be reconfigured to grant drop-off-only or pickup-only access.
9. The distribution device of paragraph 6, such the device further comprises a magnetic card reader for the purpose of authenticating users and granting access.
10. The process of paragraph 1 facilitated by the distribution device of paragraph 9, wherein users may be granted access by authorizing a magnetic card in their possession prior to the start of the process.
11. The distribution device of paragraph 4, such that at least one compartment may be repositioned with respect to the other components of the device, and further comprising at least one moveable member, such that the member(s) may be used to block or allow physical access to certain parts of the compartment.
12. The distribution device of paragraph 11 wherein at least one moveable member is visually opaque.
13. The distribution device of paragraph 4 such that at least one compartment may be repositioned with respect to the other components of the device, and further comprising at least one moveable member, such that the member(s) may be used to segment the compartment.
14. The distribution device of paragraph 13 such that at least one moveable member provides thermal insulation or other environmental separation.

15. The distribution device of paragraph 4 such that at least one compartment provides emergency egress from the interior of the compartment while remaining secure from the outside.

16. The distribution device of paragraph 4, such that at least one compartment provides for ventilation in the event of occupancy by a respirating organism, but not otherwise.

17. The distribution device of paragraph 4, wherein passive cooling is provided by evaporative heat loss.

18. The distribution device of paragraph 4 wherein the device additionally comprises a refrigeration or environmental control system.

19. The distribution device of paragraph 18 wherein at least one compartment may be environmentally regulated separately from the others.

20. The distribution device of paragraph 7, such that access to at least one compartment may be granted or revoked based on environmental conditions inside the compartment, or some part thereof.

21. The distribution device of paragraph 7, such that access to at least one compartment may be granted or revoked based on environmental conditions inside at least one container within the compartment.

22. A process in which items for multiple customers are prepared in a fulfillment facility, such that items comprising several orders may be picked in one batch, and such that items in this batch may be separated into orders for individual customers and subsequently packed.

23. A device comprising at least one light substantially adjacent to at least one bin containing items of a certain type, such that the light may be actuated to direct a worker to the bin.

24. The device of paragraph 23 wherein the device comprises multiple lights, at least two of which are connected and controlled by a string of at least one conducting wire.

25. The device of paragraph 23 further comprising a mobile computer connected to the device.

26. The device of paragraph 25 wherein the mobile computer is not connected physically to the device but is connected via wireless data transmission and receipt.

27. The device of paragraph 25 wherein the mobile computer further comprises a visual display indicating additional information about the items to be handled.

28. The device of paragraph 25 wherein the mobile computer further comprises an audio interface communicating additional information about the items to be handled 29. The device of paragraph 25 wherein the mobile computer presents a human interface which can be used to record the result of handling the item.

30. The device of paragraph 29 wherein the human interface is a speech recognition interface.

31. The device of paragraph 29 wherein the human interface is a push button.

32. The device of paragraph 29 wherein the human interface is a touch screen.

33. The device of paragraph 6, additionally comprising a mobile computer with which information may be exchanged 33. A. The device of paragraph 6 additionally comprising at least one machine readable label on at least one compartment.

34. The device of paragraph 24 wherein additional lights may be added to a string of wire to which additional lights are connected by means of insulation displacement.

35. The process of paragraph I further comprising a device to which instructions for delivery and pickup may be electronically submitted.

36. The process of paragraph 35 wherein the device presents an interface for ordering products.

37. The process of paragraph 36 wherein the device presents contextually relevant alternative suggestions for at least one product.

38. The process of paragraph 37 wherein at least one alternative suggestion is optimized for health and/or environmental impact.

What is claimed is:

1. A computer-implemented process for accepting, fulfilling and delivering a plurality of orders of products to a plurality of customers located substantially within at least one geographical region, the computer-implemented process being executed by a processor operatively coupled to a memory storing computer program instructions and implemented by hardware, the processor running the computer program instructions in the memory to control the hardware to perform the computer-implemented process, comprising:

obtaining the plurality of orders from the plurality of customers located within the at least one geographical region, wherein the plurality of orders are made by the plurality of customers using one or more computer-implemented customer devices;

fulfilling the plurality of orders with inventory from a fulfillment facility, wherein the fulfilling of the plurality of orders is performed with one or more additional computer-implemented devices;

sorting the inventory into a plurality of containers corresponding to respective ones of the plurality of orders associated with respective ones of the plurality of customers, wherein the sorting is performed with the one or more additional computer-implemented devices;

packing the plurality of containers onto a delivery vehicle, wherein the packing comprises electronically scanning a given container of the plurality of containers for a given one of the plurality of orders, wherein the electronically scanning electronically associates the given container with the given one of the plurality of orders in a system;

transporting the plurality of containers on the delivery vehicle to a waypoint distribution site located in the at least one geographical region, wherein the waypoint distribution site comprises at least one distribution device including a plurality of compartments and a first one-way valve for air flow into the distribution device and second one-way valve for air flow out of the distribution device, wherein operation of the first and second one-way valves is enabled by a pressure change within the distribution device caused by a respirating organism occupying the distribution device, and wherein the plurality of compartments further each comprise one or more security devices to regulate access by the plurality of customers;

transferring the given container from the delivery vehicle to a compartment of the plurality of compartments, wherein the distribution device is accessible to the plurality of customers, wherein the transferring comprises further electronically scanning the given container, wherein the further electronically scanning causes a visualization to be generated on one more devices of one or more additional containers of the plurality of containers associated with the given one of the plurality of orders in the system, wherein the further electronically scanning is performed with the one or more additional computer-implemented devices, wherein a given customer of the plurality of customers requests at least one of a compartment type and a compartment location within the distribution device via the one or more computer-implemented customer devices, and wherein the request is received at one of the distribution device and the one or more additional computer-implemented devices;

wherein the distribution device comprises an electronic device configured to:

communicate with the one or more additional computer-implemented devices to receive delivery information regarding the plurality of containers associated with the given one of the plurality of orders in the system to be transferred to the distribution device, wherein the delivery information identifies the plurality of containers and identifies the distribution device;

operate in concert with a given compartment of the plurality of compartments of the distribution device and a latch of the given compartment by:

storing contents of the given compartment in the memory, the contents corresponding to the delivery information and the plurality of containers transferred to the distribution device, and operating the latch to release the given compartment of the plurality of compartments to a user upon authentication by the given customer via the one or more computer-implemented customer devices to allow access by the user to the given container within the given compartment wherein the electronic device of the distribution device comprises an interface device configured to receive information from the one or more computer-implemented customer devices utilized by the distribution device to perform the authentication, wherein the authentication 1s made by the given customer via the one or more computer-implemented customer devices, and wherein the authentication is verified by the one or more security devices prior to releasing the given compartment, and wherein the information from the one or more computer-implemented customer devices is encrypted upon being supplied by the one or more computer-implemented customer devices; and repeating the transporting, transferring and releasing until each of the plurality of orders have been received;

wherein at least two of the one or more computer-implemented customer devices, the one or more additional computer-implemented devices, the plurality of compartments, and the one or more security devices are at least one of electronically connected and electro-mechanically connected with each other.

2. The computer-implemented process of claim 1, wherein the at least one geographical region is a county, a city, a town, a village, a burrow, a neighborhood, a city block, or a food desert.

3. The computer-implemented process of claim 1, wherein the one or more computer-implemented customer devices comprise a personal computer.

4. The computer-implemented process of claim 1, wherein the one or more computer-implemented customer devices comprise a mobile device.

5. The computer-implemented process of claim 1, wherein the one or more computer-implemented customer devices are connected to the internet.

6. The computer-implemented process of claim 1, wherein the at least one geographical region includes between about 1 and 50,000 people.

7. The computer-implemented process of claim 1, wherein the at least one geographical region includes between about 1 and 25,000 people.

8. The computer-implemented process of claim 1, wherein the at least one geographical region includes between about 1 and 10,000 people.

9. The computer-implemented process of claim 1, wherein the at least one geographical region includes between about 1 and 5000 people.

10. The computer-implemented process of claim 1, wherein the one or more additional computer-implemented devices tracks a status of the plurality of orders.

11. The computer-implemented process of claim 1, wherein the fulfilling the plurality of orders further includes substituting inventory with suitable replacements.

12. The computer-implemented process of claim 1, wherein the packing further comprises locating the plurality of containers corresponding to the respective ones of the plurality of orders onto the delivery vehicle in an order corresponding to an order in which the plurality of containers are to be delivered.

13. The computer-implemented process of claim 1, wherein the distribution device further comprises at least one of one or more environmental regulation devices and one or more environmental monitoring devices.

14. The computer-implemented process of claim 13, wherein at least one of the one or more environmental regulation devices and the one or more environmental monitoring devices are selected from the group consisting of a thermosensor, a humidity sensor, a thermometer, a pressure sensor, and a light sensor.

15. The computer-implemented process of claim 14, wherein at least one of the one or more environmental regulation devices and the one or more environmental monitoring devices at least one of operates and is at least one remotely and locally controlled by an additional computer-implemented device of the one or more additional computer-implemented devices to control and regulate an environment of the plurality of compartments of the distribution device.

16. The computer-implemented process of claim 1, wherein the one or more security devices comprise at least one of a lock, a card swiper, a computerized key pad, a retinal scanner, a finger print scanner, and a voice activated scanner.

17. The computer-implemented process of claim 1, further comprising picking up locally-grown food items during transit and optionally fulfilling the plurality of orders with the locally-grown food items.

18. The computer-implemented process of claim 1, wherein the visualization further comprises an indication of one or more designated locations for placement of the given container in the at least one distribution device.

19. The computer-implemented process of claim 1, wherein two or more compartments of the plurality of compartments are electro-mechanically connected with each other.

20. The computer-implemented process of claim 1, further comprising identifying a given one of the one or more additional computer-implemented devices to the distribution device to open one or more available compartments of the plurality of compartments prior to the transferring.

* * * * *